J. H. HARRIS.
Car Coupling.

No. 63,514.  Patented Apr. 2, 1867.

Witnesses.
Jas. A. Service
Alex T. Roberts

Inventor
J. H. Harris
per Munn & Co
Attorneys

United States Patent Office.

JAMES H. HARRIS, OF VIRGINIA, ILLINOIS.

Letters Patent No. 63,514, dated April 2, 1867.

---

IMPROVED CAR-COUPLING.

---

*The Schedule referred to in these Letters Patent and making part of the same.*

---

TO ALL WHOM IT MAY CONCERN:

Be it known that I, JAMES H. HARRIS, of Virginia, in the county of Cass, and State of Illinois, have invented a new and improved Car-Coupling; and I do hereby declare that the following is a full, clear, and exact description thereof, reference being had to the accompanying drawings, forming part of this specification.

The nature of my invention consists in constructing a car-coupling in such a manner that when the cars are coupled it brings the platform of the cars so near together that a person cannot fall between them, thus preventing many accidents to which railroad men are daily exposed.

It further consists in so constructing it that one car may be ten or twelve inches higher than the other without interfering with the operation of my invention, and more particularly consists in attaching to the bumper a strong cylinder provided with pintles to catch the coupling link, also with notched wheels and pendent levers for the purpose of holding the cylinder in its place.

To enable others skilled in the art to make and use my invention, I will proceed to describe its construction and operation.

Figure 1:
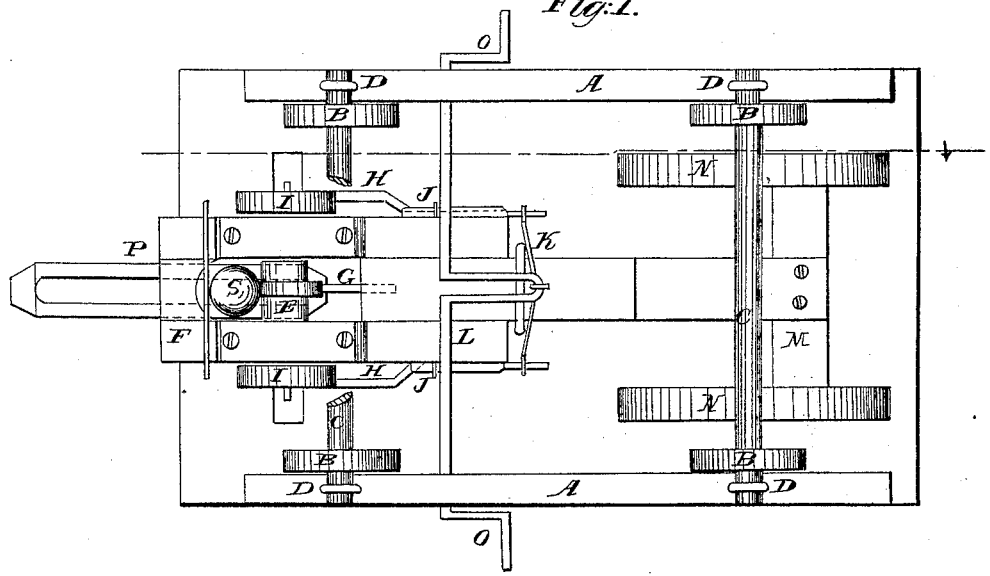
Figure 2:
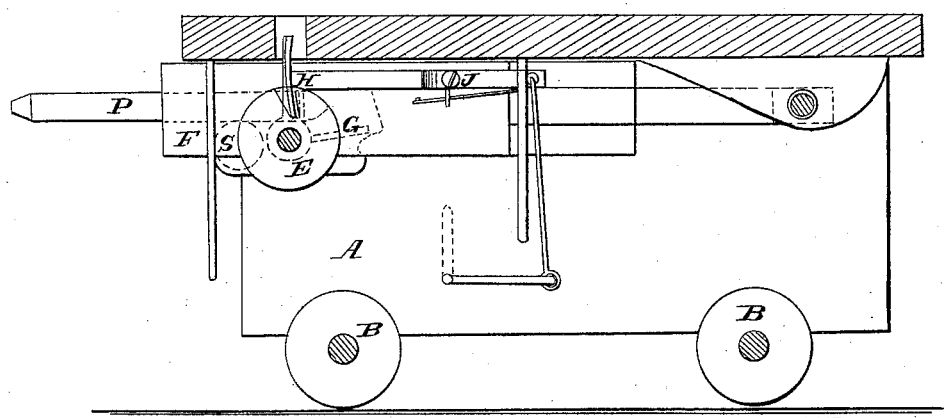

Figure 1 is a top plan view of my improved coupling attached to a car with the floor of the car removed.
Figure 2 is a side elevation of the same.
Similar letters of reference indicate like parts.

A represents the truck of an ordinary car made in the common way and mounted on wheels B B B B, which are secured to axles C C, which run in suitable bearings D D, which are secured to the truck frame A. E is a strong iron cylinder, which turns in suitable bearings secured to the bumper F. In the said cylinder are secured pintles or lugs G for the purpose of engaging and holding the link. On the side opposite the said pintles is a ball or counterbalance for the purpose of assisting to raise the levers H H out of the notches in the wheels I I, which are rigidly secured upon the shafts or ends of the cylinder E. These levers H H are located one upon each side of the bumper, and hung upon pivot bolts at J J, at the rear end of which is a stirrup, K, that connects the two levers. The lower end of the said stirrup is connected to a crank-shaft, L; the said crank-shaft extends transversely across the truck and secured in any proper manner thereto. The rear end of the bumper F is secured to the cross-piece M, which is secured to the timbers N N. O is the crank attached to the crank-shaft L for the purpose of disengaging the pintles from the notches in the cylinder E and link P to uncouple the cars. My improved coupling is simple, cheap, and easily understood, and almost self-acting in its operation. It will be understood that the crank-shaft L answers the double purpose of raising the end of the bumper to accommodate the adjustment of the link, to the approaching cars without the necessity of the person going between them for the purpose of adjusting the link which would endanger his life. Also it serves the purpose of uncoupling the cars. It will also be observed that when the link enters the bumper it strikes one of the pintles in the cylinder and forces it back until the pintle enters the loop of the link, when the ball or counterbalance S falls down and brings the pintle in an upright position, and at the same time the levers H H fall into the notches in the wheels I I, and the whole is fast. When it is desired to disconnect the cars, by turning the crank back raises the levers out of the notches in the wheels, and the cylinder is then allowed to turn forward, which draws the link out or off the pintle and the cars become disconnected, making it one of the most safe and durable couplings now in use.

Having thus described my invention, what I claim as new, and desire to secure by Letters Patent, is—

1. The crank-shaft L, connected to the levers H H, for the purpose of elevating and lowering the bumper of a car; also to uncouple the same for the purposes and substantially as herein described.

2. I claim the cylinder E, provided with notches and pintles G G, the levers H H, and crank-shaft L, in combination with the bumper P, substantially as described.

JAS. H. HARRIS.

Witnesses:
JOHN H. WOOD,
S. S. NANCE.